US011290391B2

(12) United States Patent
Appleby et al.

(10) Patent No.: US 11,290,391 B2
(45) Date of Patent: Mar. 29, 2022

(54) SYSTEM AND METHOD FOR OPTIMAL RESOURCE ALLOCATION FOR CUSTOMER RELATED SERVICES

(71) Applicant: Skedulo Pty Ltd, Fortitude Valley (AU)

(72) Inventors: Karina Appleby, Queensland (AU); Rita Manning, Everton Park (AU); Ned Mules, Annerley (AU); Gustavo Oliveira, Nathan (AU); Revel Roestorf, Willow Vale (AU); Drew Taylor, Toowong (AU); Leila Watson, Murarrie (AU); Brandon Winch, Nundah (AU)

(73) Assignee: Skedulo Pty Ltd, Fortitude Valley (AU)

( * ) Notice: Subject to any disclaimer, the term of this patent is extended or adjusted under 35 U.S.C. 154(b) by 31 days.

(21) Appl. No.: 16/860,649

(22) Filed: Apr. 28, 2020

(65) Prior Publication Data

US 2020/0351218 A1      Nov. 5, 2020

(30) Foreign Application Priority Data

Apr. 30, 2019  (AU) ................................ 2019901467

(51) Int. Cl.
| | |
|---|---|
| *H04L 1/00* | (2006.01) |
| *H04L 47/78* | (2022.01) |
| *H04L 47/765* | (2022.01) |
| *H04L 47/83* | (2022.01) |
| *H04L 47/70* | (2022.01) |
| *H04L 47/80* | (2022.01) |

(52) U.S. Cl.
CPC .......... *H04L 47/781* (2013.01); *H04L 47/765* (2013.01); *H04L 47/788* (2013.01); *H04L 47/805* (2013.01); *H04L 47/822* (2013.01); *H04L 47/823* (2013.01)

(58) Field of Classification Search
CPC ... H04L 47/781; H04L 47/765; H04L 47/788; H04L 47/805; G06Q 40/025; G06Q 40/02; G06Q 20/02; G06Q 20/102
See application file for complete search history.

(56) References Cited

U.S. PATENT DOCUMENTS

| | | | |
|---|---|---|---|
| 7,742,954 B1 * | 6/2010 | Handel | G06Q 30/08 705/26.5 |
| 9,984,412 B1 * | 5/2018 | Poursartip | G06Q 20/3224 |
| 10,657,570 B1 * | 5/2020 | Viswanath | G06Q 30/0611 |
| 2003/0069858 A1 * | 4/2003 | Kittlitz | G06Q 20/02 705/76 |

(Continued)

*Primary Examiner* — Abdelnabi O Musa
(74) *Attorney, Agent, or Firm* — Honigman LLP; Brett A. Krueger

(57) ABSTRACT

The present disclosure relates generally to an improvement in computer processing to achieve a new outcome in real time with lower processing requirements and more particularly to a system and method for optimal resource allocation implemented in real time with lower processing requirements to increase responsiveness. When an electronically formatted resource response is received by a central server processing subsystem, the electronically formatted resource response is analysed first for a unique offer identifier at entry to the central server processing subsystem to identify the offer and then for an accept or decline marker.

9 Claims, 8 Drawing Sheets

(56) References Cited

U.S. PATENT DOCUMENTS

| | | | |
|---|---|---|---|
| 2007/0189520 A1* | 8/2007 | Altberg | G06Q 30/02 380/30 |
| 2013/0080320 A1* | 3/2013 | Smith | G06Q 40/025 705/40 |
| 2014/0164217 A1* | 6/2014 | Hammock | G06Q 40/025 705/38 |

* cited by examiner

SYSTEM AND METHOD FOR OPTIMAL RESOURCE ALLOCATION FOR CUSTOMER RELATED SERVICES

TECHNICAL FIELD

The present disclosure relates generally to an improvement in computer processing to achieve a new outcome in real time with lower processing requirements and more particularly to a system and method for optimal resource allocation implemented in real time with lower processing requirements to increase responsiveness.

BACKGROUND

There are a variety of scheduling applications currently available that provide the ability to coordinate and/or match available staff or providers from a pool of users to an offer to undertake work.

These prior art systems have functionality which is limited in one or more ways such as only supporting offers for short term and not ongoing employment, "first in, best dressed" functionality in which the first person to respond to an offer gets the job and general rather than targeted offers.

The above disadvantages may represent a business problem but the functionality of the prior art systems also have attendant technical problems such as their ability to operate in real time allocating a job to an available resource in a manner that closes the available offer quickly enough (or leaves it open for further action) so that users are not confused.

The efficient processing of actions within the computer implemented system is important to the confidence that users have in the system with any adverse experiences likely to result in a drop-off of user engagement and use of the system.

By providing a highly efficient processing of actions, the likelihood of false acceptances or other issues can be minimised but it is important that the system be able to process the action data as quickly as possible. Any gain in efficiency in the updating of the system will therefore lead to an enhanced user experience and greater trust and acceptance of the product.

It will be clearly understood that, if a prior art publication is referred to herein, this reference does not constitute an admission that the publication forms part of the common general knowledge in the art.

SUMMARY

The present disclosure is directed to a system and method for optimal resource allocation, which may at least partially overcome at least one of the abovementioned disadvantages or provide the consumer with a useful or commercial choice.

With the foregoing in view, the present disclosure in one form resides broadly in a system for optimal resource allocation, the system including a central server processing subsystem to:

a. Receive electronically formatted customer requirement information from at least one customer in relation to at least one item of work to be done for the at least one customer via a respective personal computing device, the central server processing subsystem creating an electronically formatted offer with one or more offer parameters associated therewith and a unique offer identifier, each offer parameter and the unique offer identifier stored in a separate searchable field in the electronically formatted offer and storing the electronically formatted offer in an electronic storage location accessible by the central server processing subsystem;

b. Send the electronically formatted offer to a number of resources via a respective personal computing device to invite a resource response from any one or more of the resources;

c. Receive an electronically formatted resource response from at least one resource, the resource response including the unique offer identifier stored in a separate searchable field and an accept or decline marker as an indication of whether the offer is accepted or declined;

Wherein when the electronically formatted resource response is received by the central server processing subsystem, the electronically formatted resource response is analysed first for the unique offer identifier at entry to the central server processing subsystem to identify the offer and then for the accept or decline marker; and When the accept or decline marker indicates acceptance, if the offer is marked as auto-allocation, the server allocates the resource to the offer using the unique offer identifier and, if the offer is not set as auto-allocation, the resource response is simply recorded against the offer using the unique offer identifier for selection of one or more resources from those that accepted when the offer has been filled.

In another form, the present disclosure resides in a system for optimal resource allocation, the system including:

a. A customer submitting a request for at least one item of work to be done via electronically formatted customer requirement information via a respective personal computing device operating a client software application;

b. A central server processing subsystem operating a server software application to:
   a. receive the electronically formatted customer requirement information;
   b. create an electronically formatted offer with one or more offer parameters associated therewith and a unique offer identifier, each offer parameter and the unique offer identifier stored in a separate searchable field in the electronically formatted offer and storing the electronically formatted offer in an electronic storage location accessible by central server processing subsystem;
   c. send the electronically formatted offer to a number of resources via a respective personal computing device to invite a resource response from any one or more of the resources;
   d. receive an electronically formatted resource response from at least one resource via the respective personal computing device, the resource response including the unique offer identifier stored in a separate searchable field and an accept or decline marker as an indication of whether the offer is accepted or declined;

Wherein when the electronically formatted resource response is received by the central server processing subsystem, the electronically formatted resource response is analysed first for the unique offer identifier at entry to the central server processing subsystem to identify the offer and then for the accept or decline marker; and When the accept or decline marker indicates acceptance, if the offer is marked as auto-allocation, the server allocates the resource to the offer using the unique offer identifier and, if the offer is not set as auto-allocation, the resource response is simply recorded against the offer using the unique offer identifier for selection of one or more resources from those that accepted when the offer has been filled.

The present disclosure relates generally to an improvement in computer processing to achieve a new outcome in real time by processing incoming action data either more quickly with the same resources as prior art systems, or in a similar time with lower computer processing requirements, and more particularly to a system and method for optimal resource allocation implemented in real time with increased system responsiveness. By storing the unique offer identifier separately from the accept or decline marker in the electronically formatted resource response and scanning first for that unique offer identifier, the system is able to identify the offer more quickly because it does not have to analyse the entire response, and once the offer is identified, can immediately identify the status of the offer and if the status of the offer is such that the offer is closed for any reason, such as it has been filled or cancelled, the system can immediately start to advise subsequent resources who have responded indicating acceptance, that the offer is completed.

In some implementations, the server "listens" to changes in status of the offer in real-time or actively monitors changes in status of the offer in real-time. When the offer is cancelled or changes to a status where it is no longer pending allocation of resources, the system will immediately start preventing resources from accepting the offer (or advising those that have indicated acceptance that the offer is completed) but it does not prevent schedulers from allocating more resources to the work item or changing the existing allocations (to be explained further below). Changes to the status of the offer, particularly the change from pending to fully resourced, may occur automatically, particularly for auto-allocation offers, driven by the server allocating resources to the offer as they are received.

In order to understand the present disclosure, the users of the system of the present disclosure can be categorised in a number of different categories, with each category of users having different access to the system and/or different rights or abilities to interact with the system.

The different categories of user will typically include resource users or "resources", customers, schedulers and system administrators. Normally the users will require registration within the system prior to access. There can be one or more of any type of user.

A resource user or resource is typically those users that will perform work which has been allocated by the system of the present disclosure.

A customer will typically be a user that requires work to be done, which is then resourced using the system of the present disclosure.

A scheduler will typically be a user which is an agent of any one or more of a customer, a resource, an employer of a customer, an employer of a resource, a system administrator or any other user who is responsible for ensuring that customers that require work to be done adequately resourced by resources.

The system administrator will typically be responsible for maintaining the system and optionally, the central server processing subsystem and/or central server software application.

As will be clear from above, there will also typically be at least one client software application, typically a client software application operating on each personal computing device of a user that accesses the system and at least one server software application. Typically, the different categories of users will have access to different software applications and/or parts thereof depending upon their category. A user may be categorised in more than one category.

Generally, there will be a primary server software application and one or more secondary client software applications that are used to access, communicate and/or interact with the primary server software application. The server software application will typically be responsible for the bulk of the processing load in the system of the present disclosure including creation of the offer, sending the offer, monitoring the responses which are received from resources, allocating the resources to the offer and monitoring and changing the status of the offer in real time.

The secondary client software application will typically be an access application design and undertaking limited actions at the point of the personal computing devices upon which the client software applications are operating and communicating information to and from the primary server software application in order to minimise processing load as the personal computing devices. Certain actions will typically take place using the secondary client software application for example, the electronic formatting of the response from the resource to ensure that the separate searchable fields of the offer, particularly the unique offer identifier and the accepted or declined market, are maintained.

As mentioned above, all of the electronically formatted offers which are created and issued using the system of the present disclosure will include a unique offer identifier that the system (and all components operating within the system including the primary software application and the one or more secondary client software applications) may ensure remains associated with the offer and any and all responses received throughout the offer and allocation process. The provision of the electronic format of the offer and any responses received allows the offer identification to be more easily and quickly located by the server software application upon receiving a response to allow the server software application to deal with the response more quickly than conventional systems.

As mentioned above, the central server processing subsystem will typically operate the primary server software application and the secondary client software application will typically be operated by a number of personal computing devices which are owned by or accessible by one or more of the users of the system. The central server processing subsystem will typically be associated with a communications network as will each of the personal computing devices to allow information to be exchanged over the communications network to facilitate the present disclosure.

Each of the users of the system of the present disclosure may have a unique identifier, normally a code or number which may be alphanumeric or any other type of code or number. This may allow tracking and/or logging of the actions of each of the users in the system according to that unique identifier.

In an example embodiment, the customer will typically notify the system of work that the customer wishes to have performed. The customer will typically notify the system either directly using the secondary client software application and/or using a scheduler using a secondary client software application. As part of the notification, the customer will typically define one or more parameters associated with the work which the customer wishes to have performed. These parameters are important as the parameters will typically frame the creation of the offer.

The customer and/or scheduler may provide the parameters in the form of a work order. Preferably, the work order will be entered or provided or created by the customer and/or scheduler using an electronically fillable form provided with a number of fields into which information is entered (possibly via selection from one or more available options and/or free-form entry) to ensure that the information required by the system of the present disclosure in order to create the electronically formatted offer, is provided, but also to provide a mechanism to ensure that the information entered is both available and searchable. Normally, the customer and/or scheduler will select from parameters which are provided within the electronically fillable form and as such, will be system recognisable.

Any one or more of a variety of defining parameters may be used such as for example the work type, the time and/or date of performance of the work, duration of the work required, any particular materials or equipment which is required, the geographic location of the work any qualifications that the resource must possess such as tickets or authorisations for example or any other type of parameter. As mentioned above, typically the parameters themselves which are required for creation of the offer will be provided in the electronically fillable form and the particular user will select from available, system recognised options for each of the parameters.

Any one or more of the parameters may be required fields and any one or more of the parameters may be optional fields.

Once the parameters have been provided to the system, typically via communication of the work order to the central server processing subsystem, the central server processing subsystem operating the central server software application will then preferably create the offer. The central server processing subsystem will typically extract information from the work order, typically from each of the fields provided in the work order and use that extracted information to create an electronically formatted offer.

As a part of the creation of the electronically formatted offer, the central server processing subsystem will typically create a unique offer identification and associated with the offer. In one preferred form, metadata is used in order to define the relationships between the information provided in the different portions of fields of the electronically formatted offer.

Preferably, a hierarchical relationship is provided between the information in the different portions of the electronic formatted offer with the office status being provided at a primary level in the offer which is at a higher level than the other parameters of work for the outgoing offer. Preferably, the unique offer identification is ascribed a primary level of importance in any response, with the status of the offer within the system having a secondary level of importance in relation to the response received. The hierarchy level of the information on any one or more fields may be set by either the central server processing subsystem and/or the client software application or changed by either or both. This will allow the central server processing subsystem to immediately identify the particular offer to which the response is related and then to immediately thereafter identify the status of that offer within the system in real time in order to action the response received accordingly.

The system of the present disclosure will then typically use the offer parameters defined in the offer to select one or more resources to whom the offer should be sent. The offer may be sent to any one or more of the resources. The offer will typically only be sent to resources which are available during the duration defined in the work order and/or at the time and date defined in the work order. However, an offer may be sent to all resources or to any subset, whether available or not allowing the resources to select whether they wish to respond to the offer or not.

The system of the present disclosure will typically formulate the list of resources to whom the offer should be sent based on the parameters and certain parameters may override other parameters in the selection of resources. For example, if particular qualifications are required, the system may select only the resources which have those particular qualifications. Other "threshold parameters" which can be used to formulate or at least to exclude certain resources from inclusion in an offer may include age, experience level, location or any other parameter.

Any offer may be time-limited, remaining open for a period of time only, or an offer may remain open until fully resourced.

An offer may be sent manually by a scheduler. A scheduler may be able to manually add one or more particular resources to a particular offer prior to sending or after sending.

Typically, the server software application will formulate the electronically formatted offer, then formulate a pool of resources to whom the offer should be sent, and then send the offer to those resources.

The offer will typically be provided with a status, typically when created, but at least when the offer is sent and the offer status will typically be updated in real time by the server software application. The status will normally be one of pending (an open status), filled, cancelled or completed (all closed statuses).

When the electronic offer is sent to one or more resources, this will typically be logged within the system against the appropriate users for example the customer who desires the work to be done, and any one or more of the resources to which the offer has been sent.

According to an example embodiment of the present disclosure, the secondary software applications operating on the personal computing devices of the resources to whom the offer is sent will typically maintain the electronic format, or at least the relationship data or meta data of the offer in order that the electronic format, relationship data or meta data is included in any response which is sent by resource. As mentioned above, the secondary software application may adjust the hierarchy data associated with any one or more of the fields in the offer with respect to the response. For example, the secondary software application may elevate the unique offer identifier to a primary level and set the offer status as a secondary level and then set the accept or decline marker at a tertiary level in order to provide the electronically formatted response which is sent with a particular hierarchy of information or field to ensure that the central software application searches the response in the most efficient manner.

Any one or more of the resources can then accept or decline the offer using the secondary software application operating on a respective personal computing device to electronic live format a response including the unique offer identifier, and an accept or decline marker. This may be achieved using the particular secondary software application or a more generic system such as the Short Message Service or SMS to formulate and send the response. The secondary software application used to formulate and send the response (whether proprietary or generic) will either electronically format the response and/or maintain the format of the information from the offer when creating the response. Importantly, the response need only include the unique offer identifier and to the accept or decline marker in order to be processed by the central software application.

Reducing the amount of information in the response to an absolute minimum simplifies the response, making the response smaller to send and receive but also easier and faster to search using available resources or using fewer resources because the central server application is then only searching for two pieces of information in two separate, searchable fields in the response.

When the response is received by the central server processing subsystem of the present disclosure, the unique offer identification is used to identify the particular offer and then the status of the offer is checked immediately upon identification of the offer. If the offer is still pending, meaning that further resourcing is needed, then the response is processed. If the offer is not pending, that is it has a status which is either filled or cancelled or completed, then the server software application may create an automatic reply and send that automatic reply to the resource advising that the offer has been filled or cancelled or completed depending upon the particular status of the offer.

In situations where the resource has already been allocated to work during the particular offer time, date and/or duration, then the response may be rejected with an appropriate reply sent to the resource. Depending upon the settings of the particular resource, and/or the particular offer, the resource may be given the opportunity to confirm that they wish to undertake the work, and a further response may be sent confirming this whereupon the system of the present disclosure will typically check to see whether the offer is still pending, and if so, allocate the resource. Therefore, in certain circumstances, a resource may be allowed to "double book". This will typically depend on the circumstances and parameters of the offer as a customer will not necessarily want to allow a resource to double book themselves.

In the processing of the response, which may be set to auto allocation (which means that accepting resources are automatically allocated to the work until the offer is filled) or manual allocation in which case a scheduler will normally allocate one or more resources to an offer until filled. If the response includes an accept marker, then the response is typically processed according to the auto allocation rules and allocated to the work or putting a manual, pending allocation list. Manual allocation is normally done by one or more schedulers using their secondary software application If the response includes a decline marker, then the response may be stored against the offer, the resource and any other location within the system and then the system moves on to the next response. Responses are normally processed in order of receipt but importantly, processing times are reduces compared to prior art systems Importantly, regardless of how the response is sent back to the system of the present disclosure, the unique offer identifier is maintained in a separate lease searchable field from the accept and decline marker.

As mentioned above, the system of the present disclosure will typically monitor the status of the offers and when an offer has been fully resourced, the system of the present disclosure will typically automatically close the offer changing the status to filled which will then typically result in any further responses being notified that the offer has been filled. This will typically occur in real time, due to the nature of the processing relationship of the responses as they are received by the system, may be achieved more quickly, and with more certainty than with conventional mechanisms.

The central server software application will typically maintain a data map of all data within the system, particularly in relation to offers that are created, the offer parameters for each offer, the resources to whom the offer has been sent, the resource data and the responses that are received including whether the responses indicate an accept or decline and further, which resources are allocated to a particular offer. All of this information will typically be searchable with the level of searchability typically provided according to the category of the user that wishes to search the information. A number of filters may be available in order to allow users to filter information or data from within the system.

In the system of the present disclosure, the changes to the offer and the resources which are allocated to an offer will typically be made in real time. The electronic formatting of the offer and the response together with the particular processing hierarchy provided allows the responses to be processed more quickly with a given amount of processing resources applied by the central server processing subsystem or as quickly as conventional mechanisms with fewer processing resources due to the segregation into separate searchable fields and the and hierarchy of the fields in the offers/responses.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION

Figure 1:
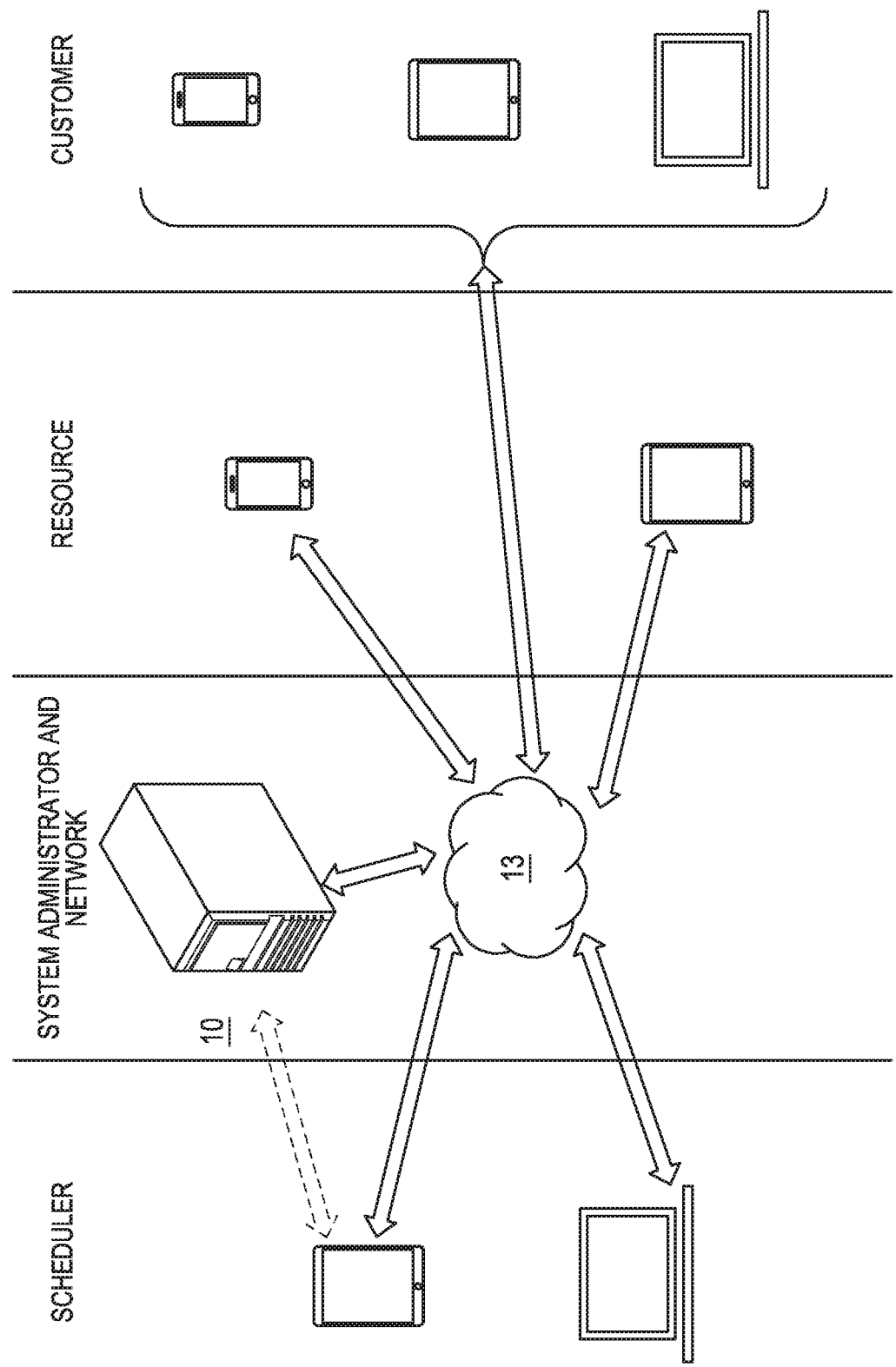
FIG. 1 is a schematic view of a system for optimal resource allocation according to an example embodiment of the present disclosure showing the users involved.
Figure 2:
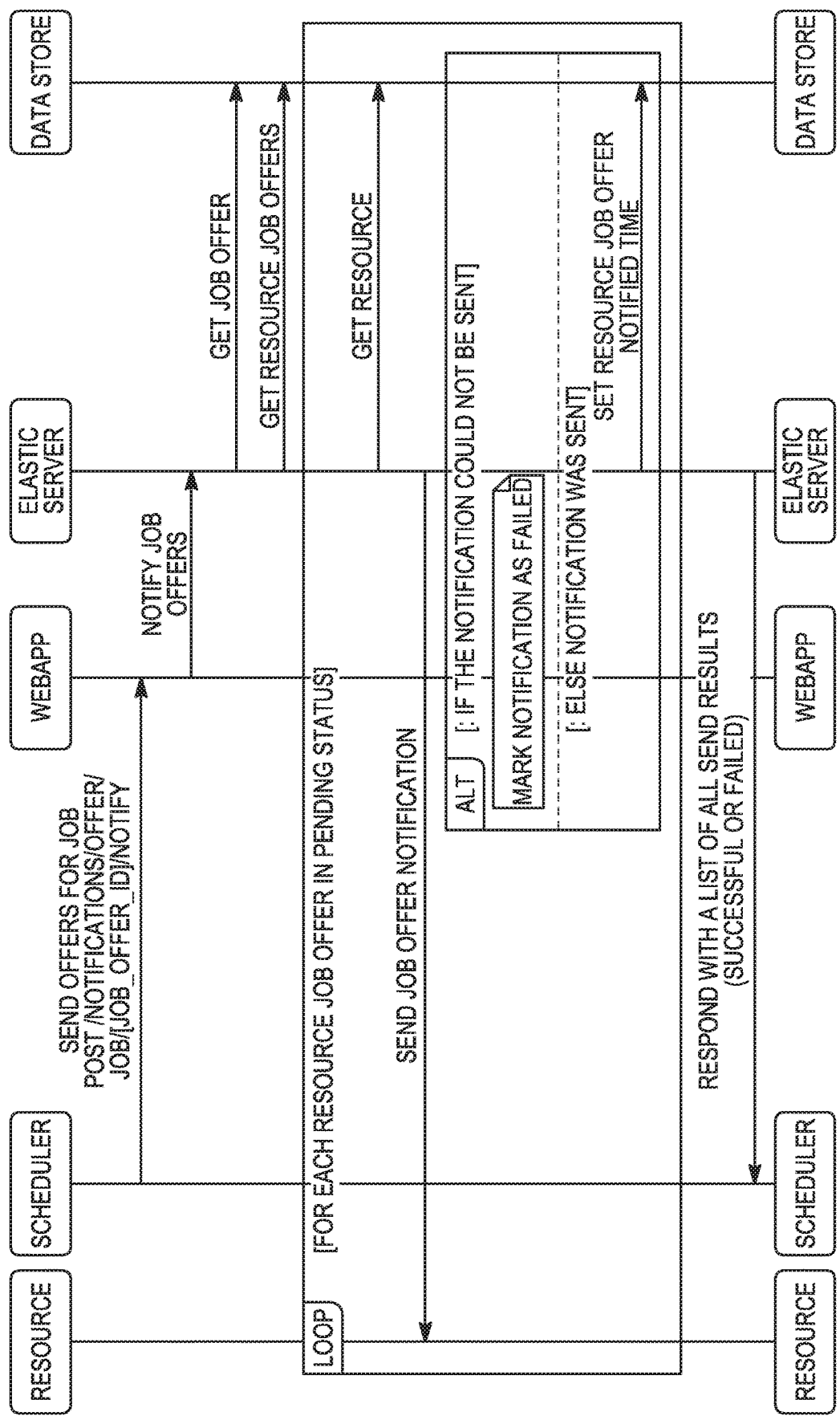
FIG. 2 is a sequence diagram for sending offer notifications according to an example embodiment.
Figure 3:
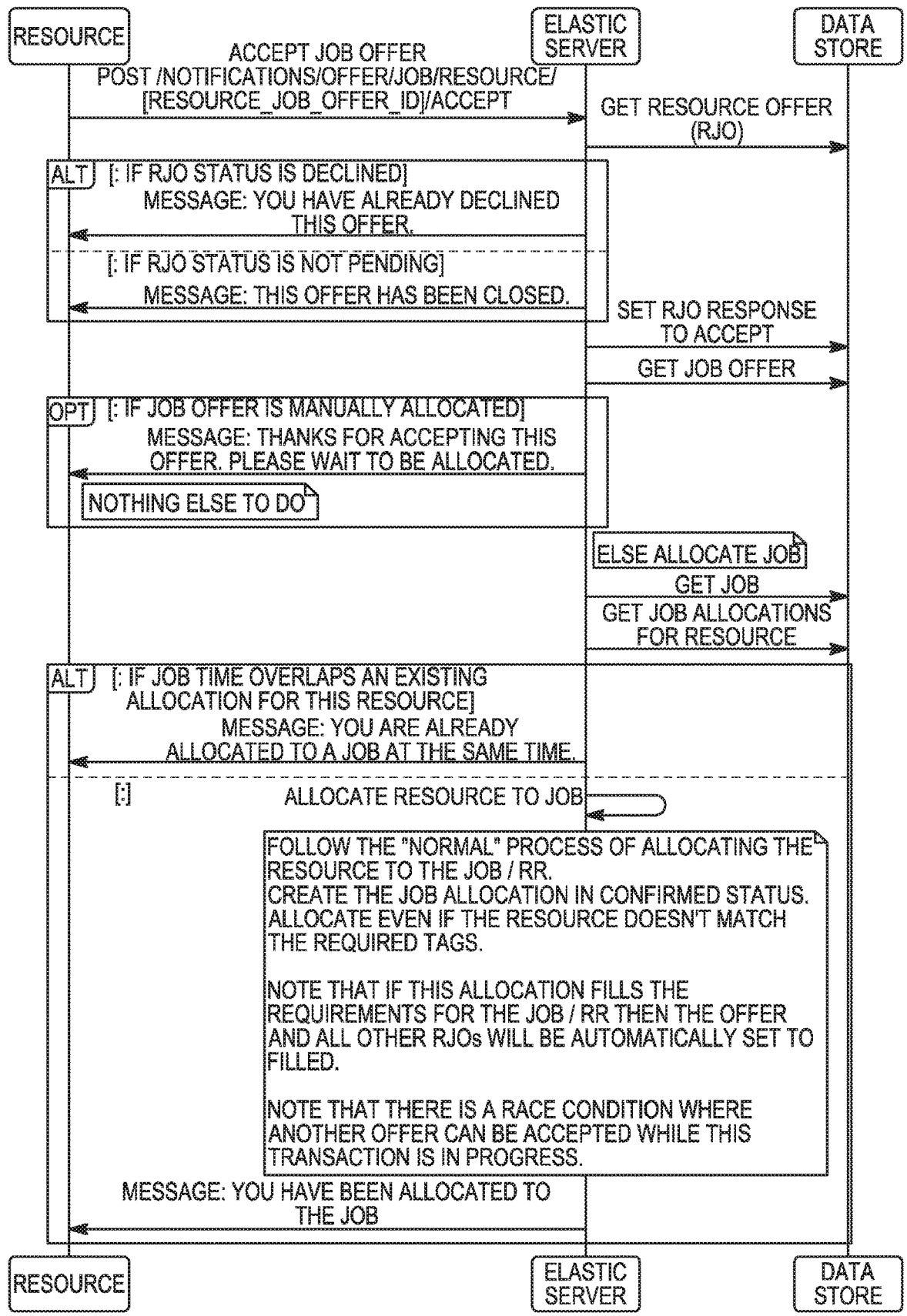
FIG. 3 is a sequence diagram for accepting an offer according to an example embodiment.
Figure 4:
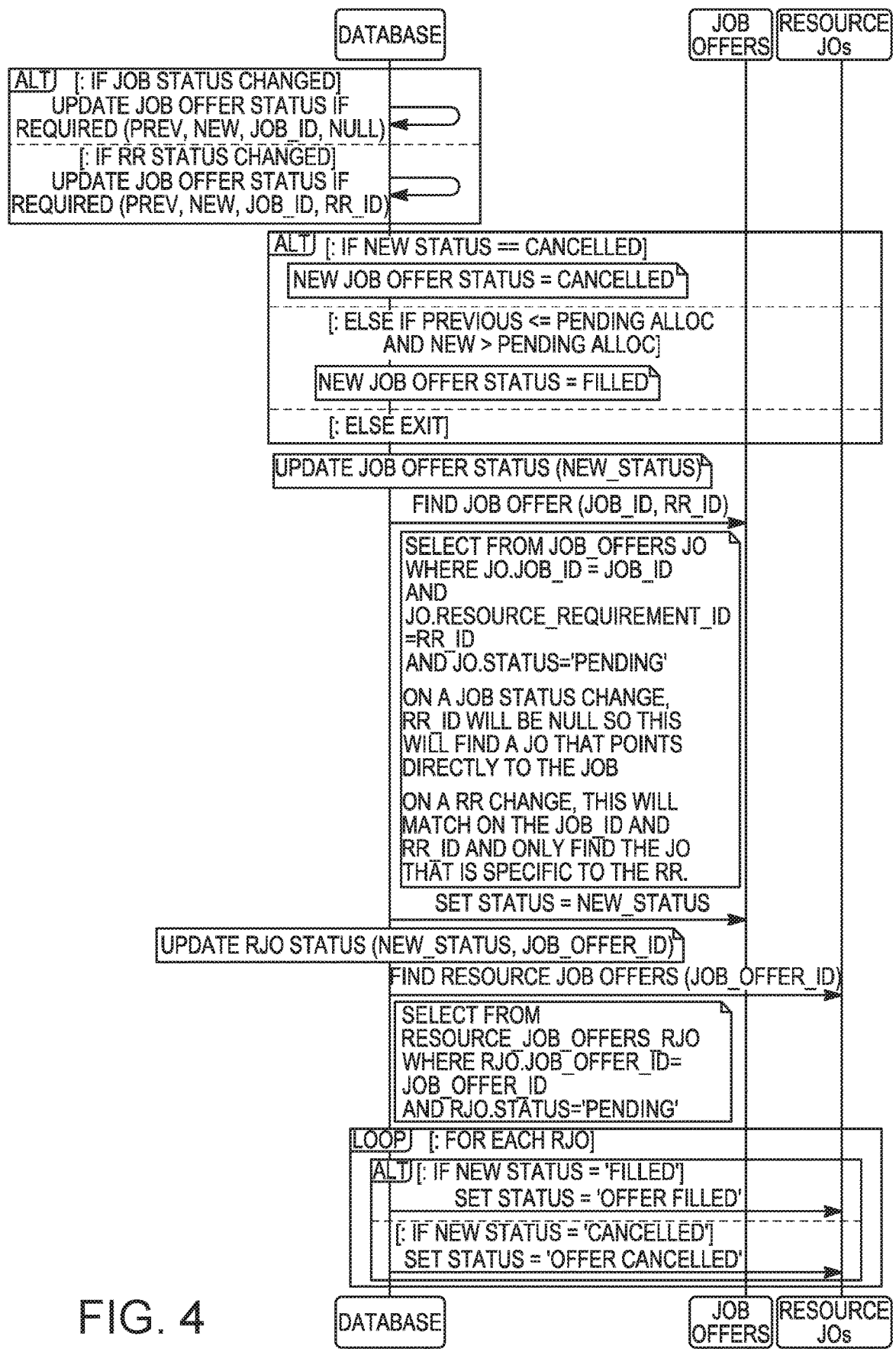
FIG. 4 is a sequence diagram for auto-updating offer status according to an example embodiment.
Figure 5:
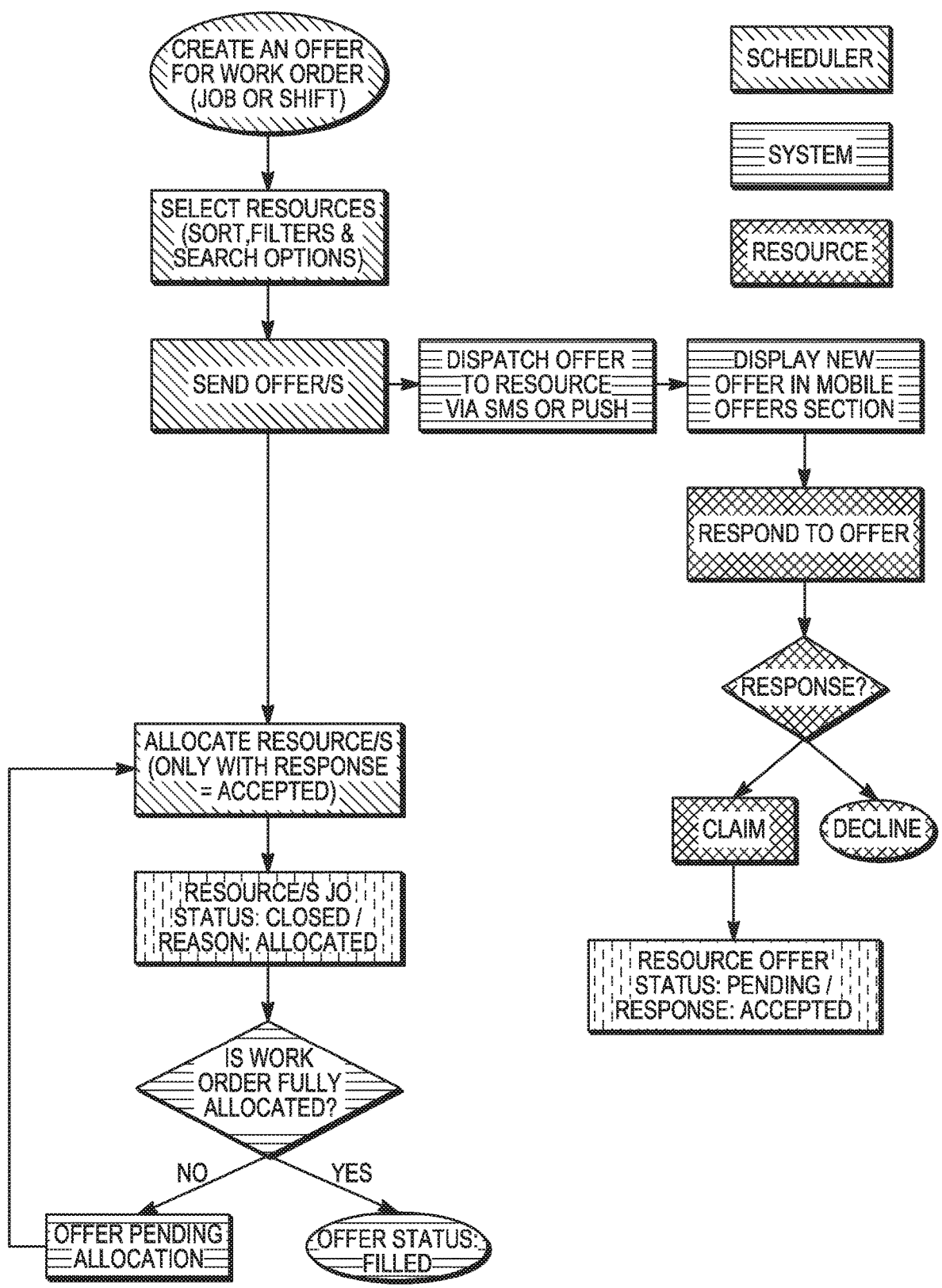
FIG. 5 is a flow diagram for successful allocation of resources via an offer controlled by a scheduler according to an example embodiment.
Figure 6:
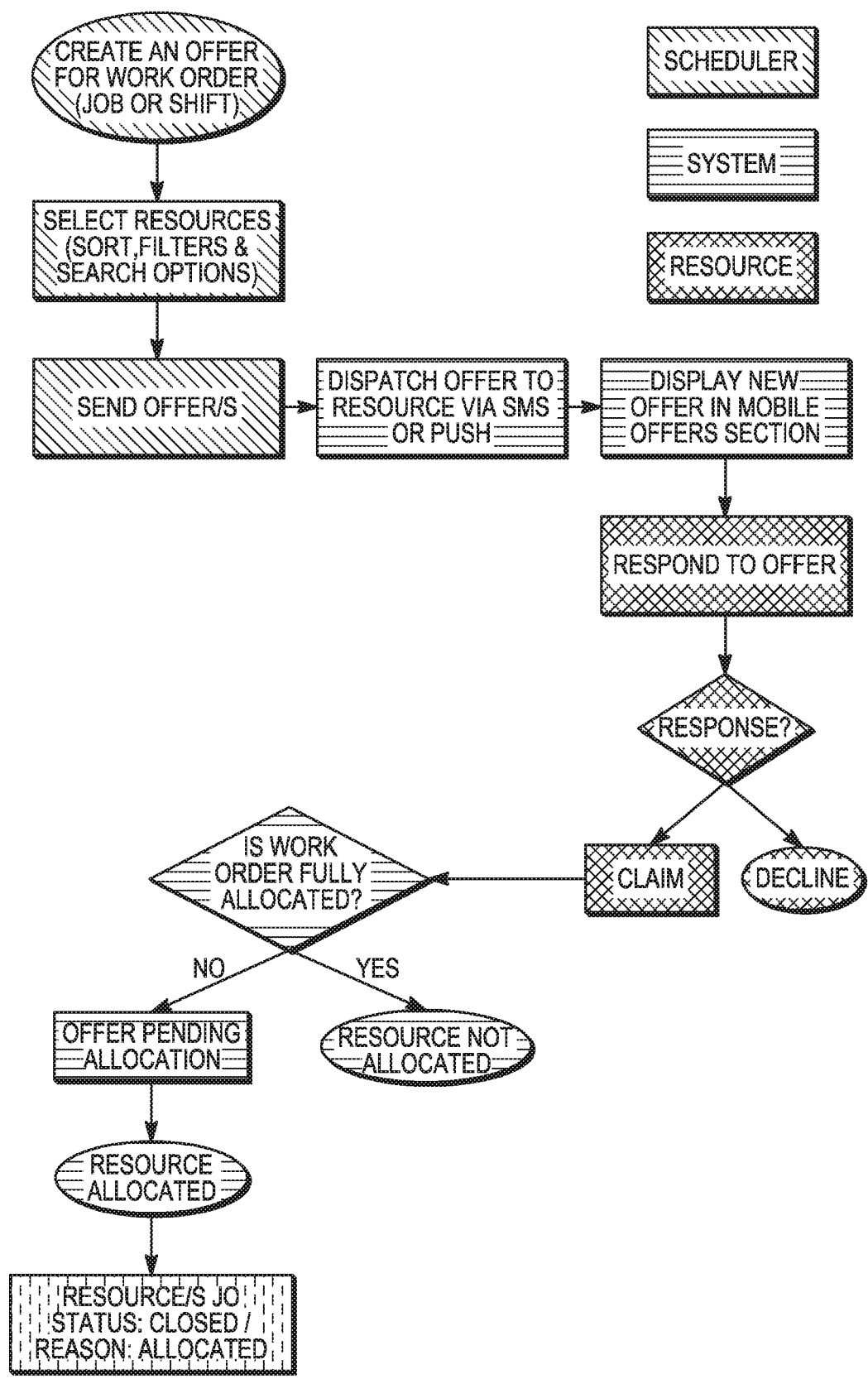
FIG. 6 is a flow diagram for successful auto-allocation of resources via an offer according to an example embodiment.
Figure 7A:
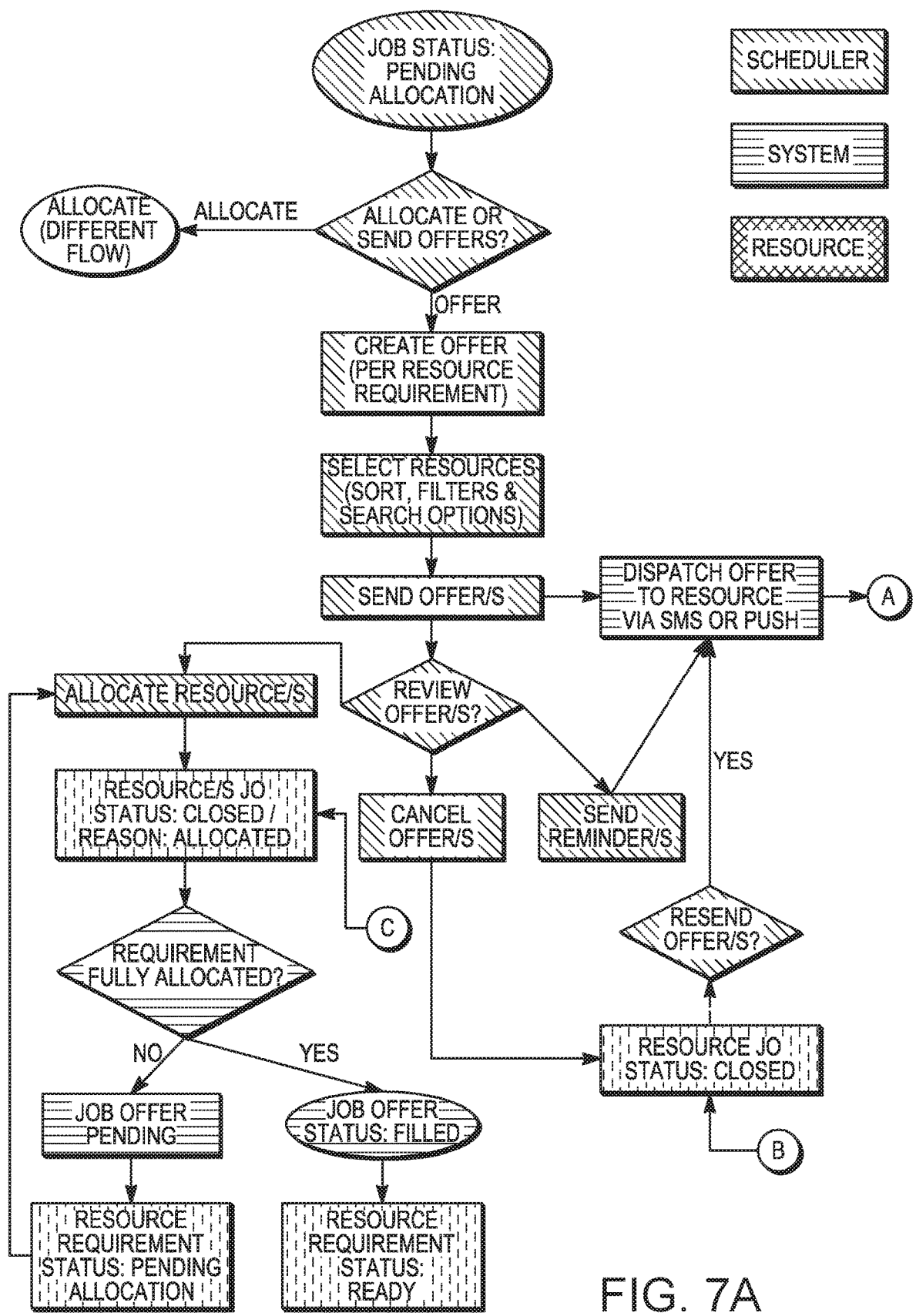
FIGS. 7A and 7B illustrate a flow diagram for an offer exception case such as offline sender/receiver or failed dispatch according to an example embodiment.
Figure 7B:
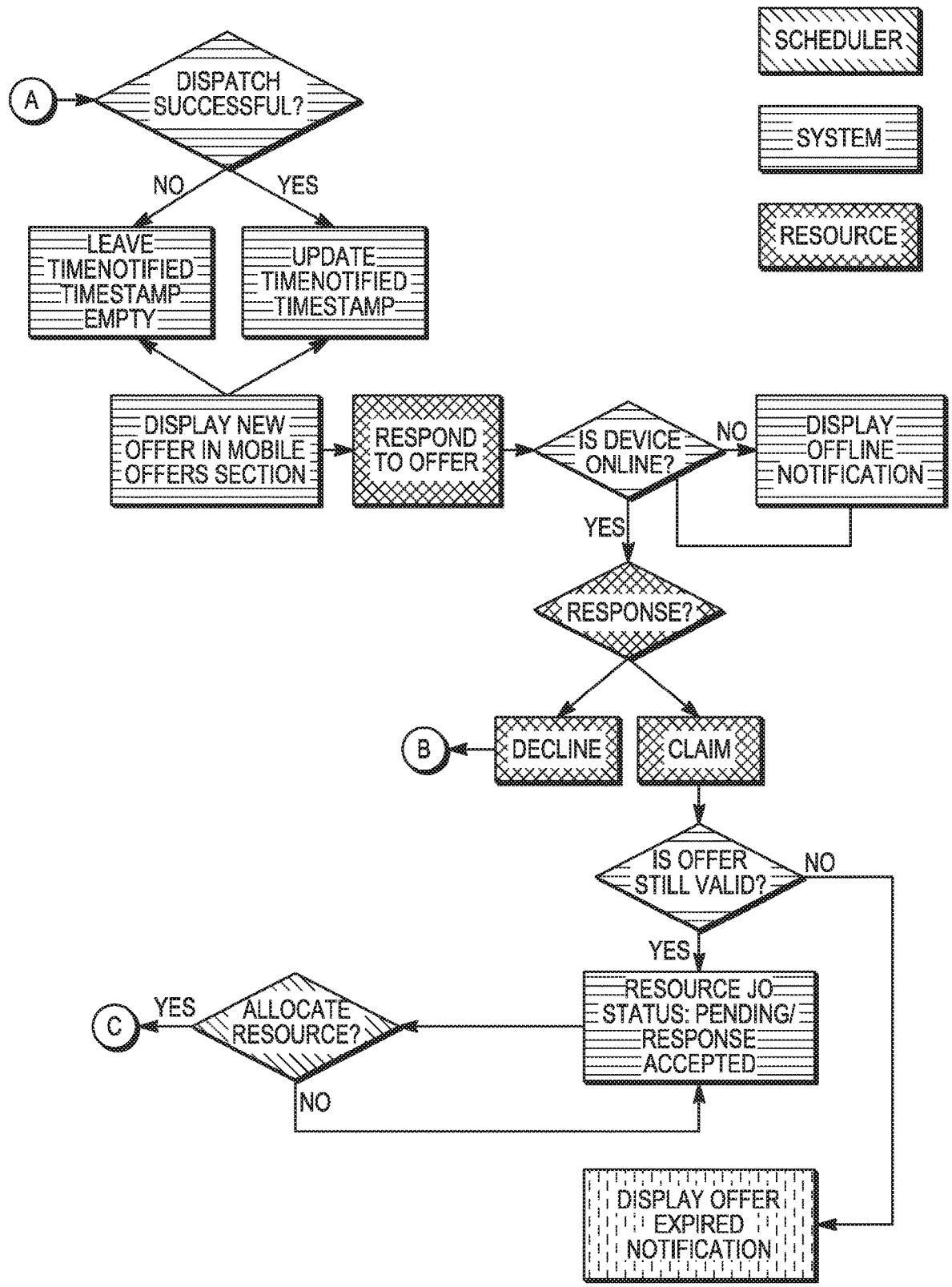

According to implementations of the present disclosure, a computer implemented system and method for optimal resource allocation is provided An example embodiment of the present disclosure provides a mechanism for a scheduler to offer the opportunity to perform an item of work (a Job, a component of a Job, a Shift or multiple Shifts) for a specific time period to multiple resources (workers) via their mobile devices.

A scheduler can create an offer and define the resources who will receive the offer. The scheduler can choose to apply filters to show only the resources who have availability during the time of the offered work or only those who meet the required attributes for the work (e.g. skills and qualifications).

Resources will be notified via a push notification or SMS when they have been made an offer. They can review their offers in their own time and can choose to accept, decline or ignore any offers they have received.

Responses can be sent from the mobile app or as an SMS message (if the offer was issued via SMS). After an offer to an individual (a resource offer) is accepted, a scheduler (back end operator) has the option to allocate the work item to the resource. A given work item can eventually be allocated to multiple resources and the number of resources required to execute a given work item can be specified by the scheduler.

An alternative to the scheduler manually allocating to each resource is automatic allocation. An offer can be marked as "auto-allocation" which means resources will be allocated on a first-come-first-served basis. When they accept the offer, the resource will be allocated immediately, so long as this does not allocate more than the required number of people on the work item and does not "double-book" the resource. If the resource is already allocated to other work at the same time, they will not be allocated and a response will be sent back to ask them to confirm that they really want the work. The resource can then choose to re-confirm their acceptance of the offer.

An offer for a work item will be automatically closed when the required number of resources have been allocated, the work has started, or the work was cancelled. If a resource attempts to accept or decline the offer after it has been closed, they will be told this is not possible.

Offer Structure

An Offer is a record in the database that can be associated with a single job, a component of a job (a resource requirement), a single shift or a group of shifts.

An existing item of work is associated with an Offer via a foreign key in the Offer table (for Jobs and Resource Requirements) or via a join table for Shifts, as this is a "many-to-many" relationship. An Offer can subsequently have multiple "Resource Offers" attached to it, where a Resource Offer is a record that the offer has been presented to a specific resource. Each Resource Offer is associated with its parent Offer and the Resource, via foreign keys in the Resource Offer table.

Parent Offers and Resource Offers have a Status field that indicates whether the offer is Pending (open), Filled (all resources have been allocated) or Cancelled. Resource Offers can be Cancelled independently of the parent Offer by setting the status accordingly. Resource Offers also have a field to store the response received from the resource.

Sending Offers

The offer is dispatched to all the associated resources in the form of a push notification or SMS message, depending on each resource's preference.

When notifying via SMS, the message contains instructions to the user about how they can respond.

Responding to an Offer

When responding using the mobile app, the resource's response (Accept or Decline) is sent to an API endpoint, with the unique ID of the Resource Offer included in the API request. A flag can be set to say that the resource wants to "allow double-booking", even if they are already allocated to other work at the same time.

When a response is received, the status of the resource offer is checked to see if it is still pending (open). If it is, the response is recorded against the resource offer, else the response is rejected with an error message. If the resource is already allocated to work during an overlapping time period, the response will be rejected unless they have flagged that they want to "allow double-booking".

Allocating Resources

When an Accept response is received, if the parent offer is marked as auto-allocation the server attempts to allocate the resource to the source of the offer. The server ensures that the resource is not already allocated to other work at the same time.

If the offer is not set as auto-allocation, the response is simply recorded against the resource offer and it is up to the scheduler to allocate via the user interface.

Handling SMS Responses

When responding via SMS, the SMS message must include an ID that uniquely identifies the offer within the scope of the resource's organisation. This is a 4 to 5 digit number representing the sequence number of the offer. For example, to accept offer number 123, the resource would be prompted to respond with the message "Yes 0123". Including the sequence number allows us to have more than one offer outstanding to a resource at once.

The server stores a global mapping between a resource's phone number and all outstanding SMS notifications to that number, along with associated metadata. The metadata for an outstanding SMS notification includes a pattern for validating the contents of incoming SMS messages, the ID of the resource's tenant and the database key of the pending Resource Offer. The global map is associated with a pool of "sender" phone numbers that are dedicated to sending offers. When a message sent to one of those numbers is received, the mobile phone number is looked up in the map to find all outstanding notifications to that number. If there is an outstanding notification (offer message) and the contents of the message received from the resource matches the expected pattern of the notification, the response (Accept or Decline) will be applied to the relevant Resource Offer, using the database key stored in the metadata.

Automatically Closing Offers

The server listens to changes in status of the work item. When the work item is cancelled or changes to a status where it is no longer pending allocation of resources, the associated offer and its resource offers are all set to Cancelled or Filled accordingly. This prevents resources from accepting the offer but it does not prevent schedulers from allocating more resources to the work item or changing the existing allocations.

A system for optimal resource allocation, the system including:
1. A customer submitting a request for at least one item of work to be done via electronically formatted customer requirement information via a respective personal computing device operating a client software application;
2. a central server processing subsystem operating a server software application to:
   a. receive the electronically formatted customer requirement information;
   b. create an electronically formatted offer with one or more offer parameters associated therewith and a unique offer identifier, each offer parameter and the unique offer identifier stored in a separate searchable field in the electronically formatted offer and storing the electronically formatted offer in an electronic storage location accessible by central server processing subsystem;

c. send the electronically formatted offer to a number of resources via a respective personal computing device to invite a resource response from any one or more of the resources;

d. receive an electronically formatted resource response from at least one resource via the respective personal computing device, the resource response including the unique offer identifier stored in a separate searchable field and an accept or decline marker as an indication of whether the offer is accepted or declined;

Wherein when the electronically formatted resource response is received by the central server processing subsystem, the electronically formatted resource response is analysed first for the unique offer identifier at entry to the central server processing subsystem to identify the offer and then for the accept or decline marker; and When the accept or decline marker indicates acceptance, if the offer is marked as auto-allocation, the server allocates the resource to the offer using the unique offer identifier and, if the offer is not set as auto-allocation, the resource response is simply recorded against the offer using the unique offer identifier for selection of one or more resources from those that accepted when the offer has been filled.

The present disclosure relates generally to an improvement in computer processing to achieve a new outcome in real time by processing incoming action data either more quickly with the same resources as prior art systems, or in a similar time with lower computer processing requirements, and more particularly to a system and method for optimal resource allocation implemented in real time with increased system responsiveness. By storing the unique offer identifier separately from the accept or decline marker in the electronically formatted resource response and scanning first for that unique offer identifier, the system is able to identify the offer more quickly because it does not have to analyse the entire response, and once the offer is identified, can immediately identify the status of the offer and if the status of the offer is such that the offer is closed for any reason, such as it has been filled or cancelled, the system can immediately start to advise subsequent resources who have responded indicating acceptance, that the offer is completed.

Preferably, the server "listens" to changes in status of the offer in real-time or actively monitors changes in status of the offer in real-time. When the offer is cancelled or changes to a status where it is no longer pending allocation of resources, the system will immediately start preventing resources from accepting the offer (or advising those that have indicated acceptance that the offer is completed) but it does not prevent schedulers from allocating more resources to the work item or changing the existing allocations (to be explained further below). Changes to the status of the offer, particularly the change from pending to fully resourced, may occur automatically, particularly for auto-allocation offers, driven by the server allocating resources to the offer as they are received.

In order to understand the present disclosure, the users of the system of the present disclosure can be categorised in a number of different categories, with each category of users having different access to the system and/or different rights or abilities to interact with the system.

The different categories of user will typically include resource users or "resources", customers, schedulers and system administrators. There can be one or more of any of these types of user.

A resource user or resources are typically those users that will perform work which has been allocated by the system of the present disclosure.

A customer will typically be a user that requires work to be done which is then resourced using the system of the present disclosure.

A scheduler will typically be a user which is an agent of any one or more of a customer, a resource, an employer of a customer, an employer of a resource, a system administrator or any other user who is responsible for ensuring that customers that require work to be done adequately resourced by resources.

The system administrator will typically be responsible for maintaining the system and optionally, the central server processing subsystem and/or central server software application.

As will be clear from above, there will also typically be at least one client software application and at least one server software application. Typically, the different categories of users will have access to different software applications depending upon the category.

Generally, there will be a primary server software application and one or more secondary client software applications that are used to access, communicate and/or interact with the primary server software application. The server software application will typically be responsible for the processing power in the system of the present disclosure including creation of the offer, sending the offer, monitoring the responses which are received from resources, allocating the resources to the offer and monitoring and changing the status of the offer in real time.

The secondary client software applications will typically be access applications design and undertaking limited actions at the point of the personal computing devices upon which the client software applications are operating and communicating information to and from the primary server software application. Certain actions will typically take place using the secondary client software application for example, the electronic formatting of the response from the resource to ensure that the separate searchable fields of the offer, particularly the unique offer identifier and the accepted or declined market, are maintained.

As mentioned above, all of the electronically formatted offers which are created and issued using the system of the present disclosure will include a unique offer identifier that the system (and all components operating within the system including the primary server software application and the one or more secondary client software applications) may ensure remains associated with the offer and any and all responses received throughout the offer and allocation process. The provision of the electronic format of the offer and any responses received allows the offer identification to be more easily and quickly located by the server software application upon receiving a response to allow the server software application to deal with the response more quickly than conventional systems.

As mentioned above, the central server processing subsystem will typically operate the primary server software application and the secondary client software application will typically be operated by a number of personal computing devices which are owned by or accessible by one or more of the users of the system. The central server processing subsystem will typically be associated with a communications network as will each of the personal computing devices to allow information to be exchanged over the communications network to facilitate the present disclosure.

Each of the users of the system of the present disclosure may have a unique identification code or number which may be alphanumeric or any other type of code or number. This may allow tracking and/or logging of the actions of each of the users in the system.

In an example embodiment, the customer will typically notify the system of work that the customer wishes to have performed. The customer will typically notify the system either directly using the secondary client software application and/or using a scheduler using a secondary client software application. As part of the notification, the customer will typically define parameters associated with the work which the customer wishes to have performed. These parameters are important as the parameters will typically frame the creation of the offer.

The customer and/or scheduler may provide the parameters in the form of a work order. Preferably, the work order will be entered or provided or created by the customer and/or scheduler using an electronically fillable form provided with a number of fields into which information is entered (possibly via selection from one or more available options and/or free-form entry) to ensure that the information required by the system of the present disclosure in order to create the electronically formatted offer, is provided but also to provide a mechanism to ensure that the information entered is both available and searchable. Normally, the customer and/or scheduler will select from parameters which are provided within the electronically fillable form and as such, will be system recognisable.

Any one or more of a variety of defining parameters may be used such as for example the work type, the time and/or date of performance of the work, duration of the work required, any particular materials or equipment which is required, the geographic location of the work any qualifications that the resource must possess such as tickets or authorisations for example or any other type of parameter. As mentioned above, typically the parameters themselves which are required for creation of the offer will be provided in the electronically fillable form and the particular user will select from available, system recognised options for each of the parameters.

Any one or more of the parameters may be required fields and any one or more of the parameters may be optional fields.

Once the parameters have been provided to the system, typically via communication of the work order to the central server processing subsystem, the central server processing subsystem operating the central server software application will then preferably create the offer. The central server processing subsystem will typically extract information from the work order, typically from each of the fields provided in the work order and use that extracted information to create an electronically formatted offer.

As a part of the creation of the electronically formatted offer, the central server processing subsystem will typically create a unique offer identification and associated with the offer. In one example form, meta data is used in order to define the relationships between the information provided in the different portions of the electronically formatted offer.

Preferably, a hierarchical relationship is provided between the information in the different portions of the electronic formatted offer with the office status being provided at a primary level in the offer which is at a higher level than the other parameters of work for the outgoing offer. Preferably, the unique offer identification is ascribed a primary level of importance in any response with the status of the offer within the system having a secondary level of importance in relation to the response received. This will allow the central server processing subsystem to immediately identify the particular offer to which the response is related and then to immediately thereafter identify the status of that offer within the system in real time in order to action the response received accordingly.

The system of the present disclosure will then typically use the offer parameters defined in the offer to select one or more resources to whom the offer should be sent. The offer may be sent to any one or more of the resources. The offer will typically only be sent to resources which are available during the duration defined in the work order and/or at the time and date defined in the work order. However, an offer may be sent to all resources or to any subset, whether available or not allowing the resources to select whether they wish to respond to the offer or not.

The system of the present disclosure will typically formulate the list of resources to whom the offer should be sent based on the parameters and certain parameters may override other parameters in the selection of resources. For example, if particular qualifications are required, the system may select only the resources which have those particular qualifications. Other "threshold parameters" which can be used to formulate or at least to exclude certain resources from inclusion in an offer may include age, experience level, location or any other parameter.

Any offer may be time-limited, remaining open for a period of time only, or an offer may remain open until fully resourced.

An offer may be sent manually by a scheduler. A scheduler may be able to manually add particular resources to a particular offer.

Typically, the server software application will formulate the electronically formatted offer, then formulate a pool of resources to whom the offer should be sent, and then send the offer to those resources.

The offer will typically be ascribed status, typically when created, but at least when the offer is sent and the offer status will typically be updated in real time by the server software application. The status will normally be one of pending, filled, cancelled or completed.

When the electronic offer is sent to one or more resources, this will typically be logged within the system against the appropriate users for example the customer who desires the work to be done, and any one or more of the resources to which the offer has been sent.

According to an example embodiment of the present disclosure, the secondary software applications operating on the personal computing devices of the resources to whom the offer is sent will typically maintain the electronic format, or at least the relationship data or meta data of the offer in order that the electronic format, relationship data or meta data is included in any response which is sent by resource. As mentioned above, the secondary software application may adjust the hierarchy data associated with any one or more of the fields in the offer with respect to the response. For example, the secondary software application may elevate the unique offer identifier to a primary level and set the offer status as a secondary level and then set the accept or decline marker at a tertiary level in order to provide the electronically formatted response which is sent with a particular hierarchy of information or field to ensure that the central software application searches the response in the most efficient manner.

Any one or more of the resources can then accept or decline the offer using the secondary software application operating on a respective personal computing device to electronic live format a response including the unique offer identifier, and an accept or decline marker. This may be achieved using the particular secondary software application or a more generic system such as the Short message service or SMS to formulate and send the response. The secondary software application used to formulate and send the response will either electronically format the response and/or maintain the format of the information from the offer when creating the response. Importantly, the response need only include the unique offer identifier and to the accept or decline marker in order to be processed by the central software application.

Reducing the amount of information in the response to an absolute minimum simplifies the response, making the response smaller to send and receive but also easier and faster to search using available resources or using fewer resources because the central server application is then only searching for two pieces of information in two separate, searchable fields in the response.

When the response is received by the central server processing subsystem of the present disclosure, the unique offer identification is used to identify the particular offer and then the status of the offer is checked immediately upon identification of the offer. If the offer is still pending, meaning that further resourcing is needed, then the response is processed. If the offer is not pending, that is it has a status which is either filled or cancelled or completed, then the server software application may create an automatic reply and send that automatic reply to the resource advising that the offer has been filled or cancelled or completed depending upon the particular status of the offer.

In situations where the resource has already been allocated to work during the particular offer time, date and/or duration, then the response may be rejected with an appropriate reply sent to the resource. Depending upon the settings of the particular resource, and/or the particular offer, the resource may be given the opportunity to confirm that they wish to undertake the work, and a further response may be sent confirming this whereupon the system of the present disclosure will typically check to see whether the offer is still pending, and if so, allocate the resource. Therefore, in certain circumstances, a resource may be allowed to "double book". This will typically depend on the circumstances and parameters of the offer as a customer will not necessarily want to allow a resource to double book themselves.

In the processing of the response, which may be set to auto allocation (which means that accepting resources are automatically allocated to the work until the offer is filled) or manual allocation in which case a scheduler will normally allocate one or more resources to an offer until filled. If the response includes an accept marker, then the response is typically processed according to the auto allocation rules and allocated to the work or putting a manual, pending allocation list. Manual allocation is normally done by one or more schedulers using their secondary software application If the response includes a decline marker, then the response may be stored against the offer, the resource and any other location within the system and then the system moves on to the next response.

Importantly, regardless of how the response is sent back to the system of the present disclosure, the unique offer identifier is maintained in a separate lease searchable field from the accept and decline marker.

As mentioned above, the system of the present disclosure will typically monitor the status of the offers and when an offer has been fully resourced, the system of the present disclosure will typically automatically close the offer changing the status to filled which will then typically result in any further responses being notified that the offer has been filled. This will typically occur in real time, due to the nature of the processing relationship of the responses as they are received by the system, may be achieved more quickly, and with more certainty than with conventional mechanisms.

The central server software application will typically maintain a data map of all data within the system, particularly in relation to offers that are created, the offer parameters for each offer, the resources to whom the offer has been sent, the resource data and the responses that are received including whether the responses indicate an accept or decline and further, which resources are allocated to a particular offer. All of this information will typically be searchable with the level of searchability typically provided according to the category of the user that wishes to search the information. A number of filters may be available in order to allow users to filter information or data from within the system.

Importantly in the system of the present disclosure, the changes to the offer and the resources which are allocated to an offer will typically be made in real time. The electronic formatting of the offer and the response together with the particular processing hierarchy provided allows the responses to be processed more quickly with a given amount of processing resources applied by the central server processing subsystem or as quickly as conventional mechanisms with fewer processing resources due to the segregation into separate searchable fields and the and hierarchy of the fields in the offers/responses.

Some of the advantages of the system of the present disclosure include:
  Ability to find 'last-minute' urgent covers for upcoming jobs or shifts.
  Ability for schedulers to offer single job allocation slot to multiple resources.
  Ability for schedulers to offer single shift to multiple resources.
  The system prevents the work item being over-allocated.
  Resources are notified as soon as the work has been allocated to them.
  Resources are notified if they did not get allocated the item of work that they accepted.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present disclosure. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises example forms of putting the invention into effect. The invention is, therefore, claimed in any of its forms or modifications within the proper scope of the appended claims (if any) appropriately interpreted by those skilled in the art.

What is claimed is:

1. A system for optimal resource allocation, the system including a central server processing subsystem including a memory and a processor;
   wherein the processor reads from and writes memory to:
   a. receive electronically formatted customer requirement information from at least one customer in relation to at least one item of work to be done for the at least one customer via a respective personal computing device, the central server processing subsystem creating an electronically formatted offer with one or more offer parameters associated therewith and a unique offer identifier, each offer parameter of the one or more offer parameters and the unique offer identifier stored in a separate searchable field in the electronically formatted offer and storing the electronically formatted offer in an electronic storage location accessible by the central server processing subsystem;
   b. send the electronically formatted offer to a number of resources via a respective personal computing device to invite a resource response from any one or more of the number of resources;
   c. receive an electronically formatted resource response from at least one of the number of resources, the electronically formatted resource response including the unique offer identifier stored in a separate searchable field and an accept or decline marker as an indication of whether the electronically formatted offer is accepted or declined;
   wherein when the electronically formatted resource response is received by the central server processing subsystem, the electronically formatted resource response is analyzed first for the unique offer identifier at entry to the central server processing subsystem to identify the electronically formatted offer and then for the accept or decline marker; and
   when the accept or decline marker indicates acceptance, responsive to determining that the electronically formatted offer is marked as auto-allocation, the server allocates the resource of the number of resources to the electronically formatted offer using the unique offer identifier and, responsive to determining that the electronically formatted offer is not set as auto-allocation, the electronically formatted resource response is simply recorded against the electronically formatted offer using the unique offer identifier for selection of one or more resources from the number of resources that accepted when the electronically formatted offer has been filled.

2. The system of claim 1, wherein the central server actively monitors changes in status of the electronically formatted offer in real-time.

3. The system of claim 1, wherein changes to a status of the electronically formatted offer occur automatically, driven by the server allocating resources to the electronically formatted offer as they are received.

4. The system of claim 1, further comprising at least one client software application and at least one server software application.

5. The system of claim 4, wherein provision of the electronic format of the electronically formatted offer and any electronically formatted responses received allows the offer identification to be more easily and quickly located by the server software application upon receiving an electronically formatted response.

6. The system of claim 4, wherein the central server processing subsystem operates the server software application and the client software application is operated by a number of personal computing devices.

7. The system of claim 4, wherein the server software application maintains a data map in relation to electronically formatted offers that are created, the data map including offer parameters for each electronically formatted offer, and identifiers of resources of the number of resources to whom the electronically formatted offer has been sent.

8. The system of claim 1, wherein the unique offer identifier is ascribed a primary level of importance in a response with a status of the electronically formatted offer within the system having a secondary level of importance.

9. The system of claim 1, wherein parameters which are required for creation of the electronically formatted offer are provided in an electronically fillable form and a particular user selects from available, system recognized options for each of the parameters.

* * * * *